United States Patent
Blom

Patent Number: 5,235,255
Date of Patent: Aug. 10, 1993

[54] SWITCHING CIRCUIT FOR OPERATING A DISCHARGE LAMP WITH CONSTANT POWER

[75] Inventor: Anton C. Blom, Eindhoven, Netherlands

[73] Assignee: U.S. Philips Corporation, New York, N.Y.

[21] Appl. No.: 862,048

[22] Filed: Apr. 2, 1992

[30] Foreign Application Priority Data

Apr. 4, 1991 [EP] European Pat. Off. ........ 91200780.4

[51] Int. Cl.[5] ............................................. H05B 41/36
[52] U.S. Cl. ...................................... 315/224; 315/307
[58] Field of Search ................ 315/200 R, 209 R, 224, 315/225, 226, 172, 193, 307

[56] References Cited

U.S. PATENT DOCUMENTS 4,777,409 10/1988 Tracy et al. .................... 315/224 X
4,888,524 12/1989 Ganser et al. .................. 315/224 X Primary Examiner—Steven Mottola

[57] ABSTRACT

A circuit arrangement for operating a discharge lamp with a substantially constant power $P_L$ by means of a switch mode power supply with a variable input current $I_o$ and provided with a periodically switching switching FET for controlling the variable input current by means of a drive signal. The drive signal is generated in a drive circuit (V) and is formed from a signal S1 which is proportional on the one hand to the input current and on the other hand to the lamp voltage $V_L$ and a reference signal. The circuit arrangement also includes a signal generator (IV) for generating the signal S1. The power $P_L$ to a good approximation thereby satisfies the relation $$P_L = V_b I_o - K_2/V_L$$

in which $V_b$ = supply source voltage
$V_L$ = lamp voltage
$K_2$ = proportionality constant.

14 Claims, 1 Drawing Sheet

SWITCHING CIRCUIT FOR OPERATING A DISCHARGE LAMP WITH CONSTANT POWER

BACKGROUND OF THE INVENTION

This invention relates to a circuit arrangement for operating a discharge lamp at a substantially constant power by means of a switch mode power supply having a variable input current and provided with switching means which switch periodically for controlling the input current by means of a drive signal generated in a drive circuit and formed from a signal S1 which is proportional to the input current and a reference signal, which circuit arrangement comprises means for generating the signal S1.

A circuit arrangement of the kind mentioned in the opening paragraph is known from U.S. Pat. No. 4,928,038. It is achieved in the known circuit arrangement, to a good approximation, that the connected lamp is operated at a constant power. This is important for maintaining a desired colour temperature $T_c$ of the light radiated by the lamp. This is achieved in the known circuit arrangement, which has a down-converter as the switch mode power supply, in that the pulsatory current through the switching means is measured and the measurement signal obtained in this way is used as a feedback signal in the drive circuit for generating the drive signal for driving the switching means. The circuit arrangement is also suitable in the case in which the power at which the lamp is operated is itself adjustable, for example, for dimming of the lamp. If a different type of switch mode power supply is used, the input current will also be dependent on the switching of the switching means, but it need not necessarily be identical to the current through the switching means, neither need it necessarily be pulsatory. In such a case both a measurement of the input current and a measurement of the current through the switching means is suitable for obtaining the measurement signal. An advantage of the known circuit arrangement is that a comparatively simple control system is realised whereby the variations of the operating characteristics of the lamp need not be registered. A disadvantage of the control of the known circuit arrangement, however, is that fluctuations of up to approximately 3% occur in the lamp power, which are found in practice to lead to sometimes substantial differences in the colour temperature $T_c$.

SUMMARY OF THE INVENTION

Accordingly, an object of the invention is to provide a measure by which variations in colour temperature of the operated lamp as a result of power fluctuations are considerably restricted, while the simplicity of the control system is maintained.

A circuit arrangement of the kind mentioned in the opening paragraph is for this purpose characterized in that it comprises means by which the signal S1 is also made to be dependent on the lamp voltage $V_L$.

It was surprisingly found to be possible to stabilize the lamp power accurately to within 1% over a wide range of occurring lamp voltages. Thus it was experimentally ascertained that, with a lamp voltage which was approximately 35% above the rated value, a power variation of no more than 0.8% took place. An important aspect of the measure according to the invention is that dissipations in the circuit arrangement resulting from a changing value of the lamp current are compensated for. This may be mathematically illustrated as follows. U.S. Pat. No. 4,928,038 discloses the relation between input power $P_{in}$, pulsatory input current $I_o$ averaged in time, and supply source voltage $V_b$:

$$P_{in} = V_b \cdot I_o \quad (1)$$

It is also generally known that the lamp power $P_L$ depends on the efficacy $\eta$ of the circuit arrangement, which is mathematically expressed as:

$$P_L = \eta P_{in} \quad (2)$$

Assuming that the power difference $P_{in} - P_L = P_{dis}$ is dissipated in the circuit arrangement, this can be represented by the relation $$P_{dis} = K_1 I_L \quad (3)$$

In which $I_L$ is the lamp current and $K_1$ the voltage difference owing to the impedance causing the dissipation. Starting from the desired constant value of the lamp power $P_L = V_L I_L$, relation (3) can be rewritten as $$P_{dis} = K_2 / V_L \quad (3a)$$

A relation for the lamp power is derived through combination of relation (1) and relation (3), as follows:

$$P_L = V_b I_o - K_2 / V_L \quad (4)$$

The drive of the periodically switching means is corrected for the dissipation occurring in the circuit arrangement through the addition to the signal S1 of a signal portion proportional to $1/V_L$.

Although it can be derived from the above description that dissipations in the circuit arrangement depend on the value of the lamp current $I_L$, it is preferable to use the lamp voltage $V_L$ for the control. Measurement of the lamp voltage $V_L$ can take place substantially without dissipation. By contrast, the generation of a signal proportional to the lamp current $I_L$ will in practice lead to the choice to use a measuring resistor in the circuit portion traversed by the lamp current $I_L$ for reasons of simplicity, reliability, and cost price. This accordingly results in further dissipation, which is undesirable.

It is true that the circuit arrangement according to the invention comprises an expanded measurement signal, so an expanded drive circuit compared with the known circuit arrangement. The nature of the expansion, however, means that a simple summation of two signal voltages can suffice. This can be realised in a very simple manner and at very low cost with generally known and available electronic components. The essence of the drive circuit remains intact then, and the advantage of a simple control system is not impaired.

The conservation of a simple control system becomes even more apparent upon closer consideration of relation (4), where the inventor has found that the term $K_2/V_L$ in the signal S1 represents a minor correction of the portion of the signal S1 corresponding to the term $V_b I_o$. This renders it possible to replace the relation (4) with $$P_L = V_b I_o + V_L / K_3 - C \quad (5)$$

in which $K_3$ and C are constants. Means for generating the signal S1 may be very simply constructed, on the basis of the relation (5) found, from an electric circuit for summation of signal voltages representing $I_o$ and $V_L$ and in which resistors serve to achieve the desired adjustment to represent the constant quantities $V_b$, $K_3$ and C.

A further improvement can be achieved in that the actual value is also used for $V_b$ in the generation of the signal S1. It is achieved in this way that a disturbance of the value of $V_b$ is also corrected and that thus the power consumed by the lamp is substantially fully insensitive to such a disturbance. For practical purposes, the product $V_b I_o$ can be very well represented by a summation $V_b + I_o$. The simple character of summation of signal voltages is maintained thereby for the construction of the circuit arrangement for generating the signal S1.

The circuit arrangement according to the invention is particularly suitable for operating a metal halide lamp. It is found in practice that metal halide lamps have a wide variation in actual lamp voltages. Thus it is usual for the actual lamp voltage to vary between 75 V and 115 V while the rated lamp voltage is 85 V.

BRIEF DESCRIPTION OF THE DRAWING

An embodiment of a circuit arrangement according to the invention will be explained in more detail below with reference to the accompanying drawing, in which.

DESCRIPTION OF THE PREFERRED EMBODIMENTS

Figure 1:
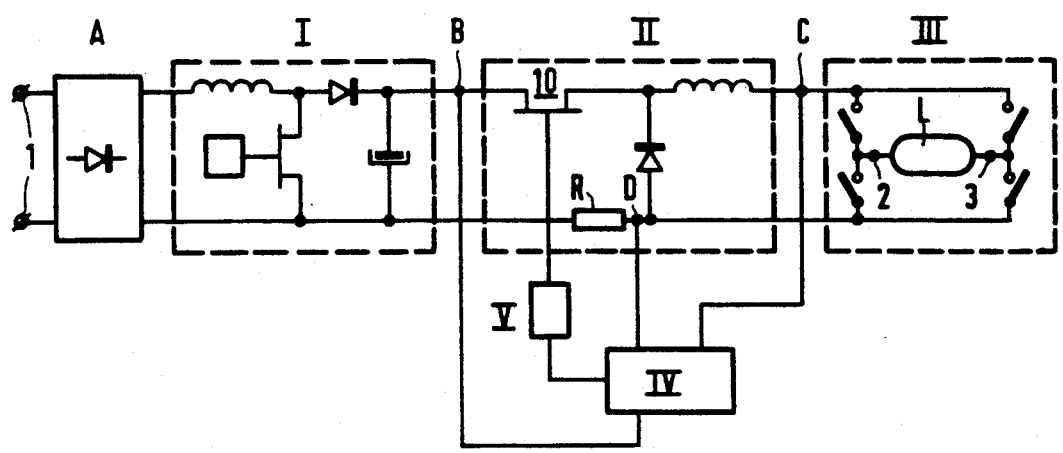
FIG. 1 is a diagram of a circuit arrangement according to the invention together with a connected lamp.

In FIG. 1, reference numeral 1 denotes connection terminals for connecting a supply source, for example, a 220 V, 50 Hz AC voltage source. The circuit arrangement comprises, in order, a rectifier circuit A, an up-converter I, a down-converter II, and a commutator network III. The down-converter fulfils the function of a switch mode power supply. A lamp L is included between lamp connection terminals 2, 3 in the commutator network 3. The lamp is included in a commutator network in order to counteract cataphoresis during operation. The rectifier circuit A may also comprise a filter circuit of a type known per se to prevent undesirable distortions of the current drawn from the supply source. The DC current formed by the rectifier circuit A is transformed in the up-converter I to a DC voltage of 385 V and acts as the supply source voltage $V_b$ for the down-converter II. The down-converter II acts as a current source and operates the commutator network with connected lamp by deriving a pulsatory current from the supply source, for which purpose it comprises periodically switching switching means 10, for example, a MOSFET. The switching means 10 are driven by a drive signal generated in a drive circuit V and formed from a signal S1 proportional to the pulsatory input current and a reference signal. Signal S1 is also dependent on lamp voltage $V_L$. The circuit arrangement comprises means IV, to be referred to as signal means hereinafter, for generating the signal S1.

The supply source voltage $V_b$ is measured at B and conducted to signal means IV. Similarly, the lamp voltage $V_L$ is measured at C and conducted to signal means IV. A measuring resistor R is included in down-converter II, through which resistor the pulsatory current $I_o$ flows. This causes a voltage differential across the measuring resistor R which is measured at D and conducted to signal means IV.

Figure 2:
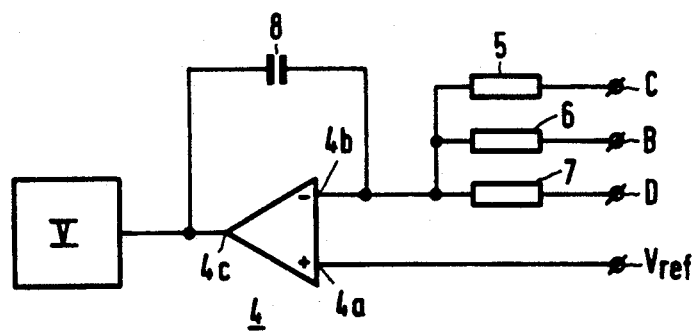
FIG. 2 shows a detailed view of a means for generating a signal S1.

In FIG. 2, the signal means IV are shown in more detail. The signal means IV comprise an operational amplifier 4 for comparison of a signal S1 with a reference signal which is present at input 4a as a voltage $V_{ref}$. The signal S1, which was obtained through summation of the signal voltages at B, C and D, is present at an input 4b. The desired adjustment takes place by means of the resistors 5, 6 and 7 in order to represent the mutual ratios necessary for the summation. The difference between signal S1 and the reference signal is integrated by means of capacitor 8 and conducted to the drive circuit V through output 4c of the operational amplifier.

In a practical realisation of the embodiment described, the circuit is operated at a 220 V, 50 Hz AC voltage source. The up-converter I supplies a DC voltage of 385 V which acts as the supply source voltage $V_b$. A metal halide lamp with a power rating of 75 W is operated by the circuit arrangement. The rated lamp voltage is 85 V. The down-converter supplies a sawtooth current with a rated value 0.88 A. A pulsatory input current flows through MOSFET 10 as well as through measuring resistor R with a time-averaged value of 0.195 A. The resistors 5, 6 and 7 of the electric summation circuit had a value of 12 Mohms, 4.7 Mohms, and 8.25 kohms. The measuring resistor R has a value of 2.75 ohms. A series of measurements was carried out whereby the actual lamp voltage and the accompanying power consumed by the lamp were measured. In a first measurement, the circuit arrangement was operated with a signal S1 as known from the prior art, so without dependence on $V_L$. In a second measurement, the circuit arrangement was operated in accordance with the invention, corrections being made for variations in dissipation in the circuit arrangement owing to variations in the lamp current $I_L$. The results of the measurements are given in Table I below, in which column 1 relates to the first series of measurements and column 2 to the second series of measurements.

TABLE I

| $V_b$ = 385 V | Power load $P_L$(W) | |
|---|---|---|
| $V_L$ (V) | 1 | 2 |
| 75 | 73.3 | 74.5 |
| 80 | 74.0 | 74.8 |
| 85 | 74.9 | 75,0 |
| 90 | 75.4 | 75.2 |
| 95 | 75.7 | 75.0 |
| 100 | 76.0 | 74.9 |
| 105 | 76.6 | 75.0 |
| 110 | 76.7 | 74.6 |
| 115 | 76.9 | 74.4 |

The influence of a disturbance of the supply source voltage $V_b$ was investigated in a third measurement. Results are given in Table II.

TABLE II

| $V_b$ (V) | Power load $P_L$ (W) | $V_L$ (V) |
|---|---|---|
| 345 | 73,3 | 91,1 |
| 350 | 73,6 | 91,2 |
| 355 | 73,9 | 91,2 |
| 360 | 74,2 | 91,3 |
| 365 | 74,4 | 91,4 |
| 370 | 74,5 | 91,4 |
| 375 | 74,7 | 91,5 |
| 380 | 74,9 | 91,5 |

TABLE II-continued

| $V_b$ (V) | Power load $P_L$ (W) | $V_L$ (V) |
|---|---|---|
| 385 | 75,0 | 91,6 |
| 390 | 75,1 | 91,6 |
| 395 | 75,2 | 91,6 |
| 400 | 75,2 | 91,6 |
| 405 | 75,3 | 91,5 |
| 410 | 75,3 | 91,5 |

I claim:

1. A circuit arrangement for operating a discharge lamp at a substantially constant power comprising: a switch mode power supply having a variable input current and provided with switching means which switch periodically for controlling the input current by means of a drive signal generated in a drive circuit, said drive signal being formed from a signal S1 which is proportional to the input current and a reference signal, which circuit arrangement comprises means for generating the signal S1, characterized in that the signal generating means also comprises means by which the signal S1 is also made to be dependent on the lamp voltage $V_L$.

2. A circuit arrangement as claimed in claim 1, wherein the means for generating the signal S1 comprise an electric circuit for summation of signal voltages which represent at least the input current and the lamp voltage.

3. A circuit arrangement as claimed in claim 1, further comprising an electric circuit which also serves for the summation of the lamp voltage with a signal voltage representing a supply source voltage.

4. A circuit arrangement as claimed in claim 2, wherein the electric circuit also serves for summation of a signal voltage representing a supply source voltage.

5. A circuit for operating a discharge lamp with substantially constant power comprising:
   a switching transistor having an output for coupling to the discharge lamp and an input for a variable input current,
   a drive circuit having an output coupled to a control electrode of the switching transistor for periodically switching the switching transistor on and off so as to control the input current by means of a drive signal supplied by the drive circuit to the switching transistor, and
   means for generating a control signal (S1) for the drive circuit, said control signal generating means being controlled by a first signal proportional to the input current, by a second signal determined by a supply voltage applied to the input of the switching transistor, and by a third signal determined by the lamp voltage.

6. A circuit as claimed in claim 5 wherein the control signal generating means are further controlled by a reference voltage.

7. A circuit as claimed in claim 6 wherein the control signal generating means comprise a comparison amplifier having a first input which receives said reference voltage and a second input which receives a signal obtained by the summation of the first, second and third signals.

8. A circuit as claimed in claim 7, wherein the comparison amplifier further comprises an integration capacitor coupled between an output of the comparison amplifier and its second input.

9. A circuit as claimed in claim 5 wherein the switching transistor is part of a switched mode power supply.

10. A circuit as claimed in claim 9 further comprising:
    a pair of input terminals for connection to a source of AC supply voltage,
    a rectifier circuit having its input coupled to said pair of input terminals, and
    an up-converter coupled between an output of the rectifier circuit and an input of the switched mode power supply.

11. A circuit as claimed in claim 10 further comprising a bidirectional commutator circuit for coupling the switched mode power supply to the discharge lamp.

12. A circuit for operating a discharge lamp with substantially constant power comprising:
    a switched mode power supply including a switching transistor coupled to the discharge lamp so as to control the current flow through the lamp,
    a drive circuit having an output coupled to a control electrode of the switching transistor for periodically switching the switching transistor on and off so as to control the lamp current by means of a drive signal supplied to the switching transistor, and
    means for generating a control signal (S1) for the drive circuit, said control signal generating means being controlled by a first signal proportional to the input current and by a second signal dependent on the lamp voltage.

13. A circuit as claimed in claim 12 wherein the switching transistor is adapted to be connected in series with the discharge lamp, and
    a current source is coupled to the input of the switched mode power supply, the periodic switching of the switching transistor causing a pulsatory input current to flow in the current whereby the first signal is proportional to said pulsatory input current.

14. A circuit as claimed in claim 12 wherein the control signal generating means is also controlled by a third signal proportional to a supply voltage applied to the input of the switched mode power supply.

* * * * *